Feb. 3, 1959    S. S. BAITS    2,871,981
AIR BLOCK VALVE CIRCUIT
Filed Feb. 5, 1957

INVENTOR.
Stephen S. Baits,
BY
Schroeder, Hofgren, Brady & Wegner
Attys.

United States Patent Office 2,871,981
Patented Feb. 3, 1959

2,871,981

AIR BLOCK VALVE CIRCUIT

Stephen S. Baits, Rockford, Ill., assignor to Sundstrand Machine Tool Co., a corporation of Illinois Application February 5, 1957, Serial No. 638,283

6 Claims. (Cl. 184—6)

This invention relates to a lubricating oil system and more particularly to a lubricating oil system for a mechanism in which the loss of oil flow or pressure from one source will cut off said one source and place another source into the system for lubricating the mechanism.

An object of this invention is to provide a new and improved lubricating oil system including means for directing lubricating oil to a mechanism from a sump when a loss of oil flow from a tank occurs.

Another object of the invention is to provide a pressure oil lubricating system for mechanism comprising a charge pump, a scavenge pump, a closable oil flow connection from the charge pump to the mechanism, a normally closed oil flow connection from the scavenge pump to the mechanism, and flow-responsive means for closing said first-mentioned oil flow connection and opening said second-mentioned oil flow connection when the charge pump fails to pump oil.

A further object of the invention is to provide a lubricating oil system for a mechanism comprising, an oil tank, a sump, a charge pump normally oil-primed from the tank, a scavenge pump normally operative to direct oil from the sump to the tank, a valve having a chamber with a first inlet at one end and a second inlet communicating with the charge and scavenge pumps, respectively, and first and second outlets communicating with said mechanism and oil tank, respectively, a valve member in said chamber having a first position in which the first inlet and the first outlet are in communication as are the second inlet and the second outlet and a second position in which the communication between the valve inlets and outlets is reversed, and spring means acting on the valve member in opposition to oil flow from the charge pump and effective upon loss of charge pump oil flow to shift the valve member from first to second positions.

A further object of the invention is to provide a lubricating oil system as defined in the preceding paragraph in which the valve member is provided with means defining a passage for purging air from the first inlet to the second outlet when the valve member is in its second position.

The objects of the invention generally set forth together with other ancillary advantages are attained by the construction and arrangement shown by way of illustration in the accompanying drawing, in which.

Figures 1, 2:
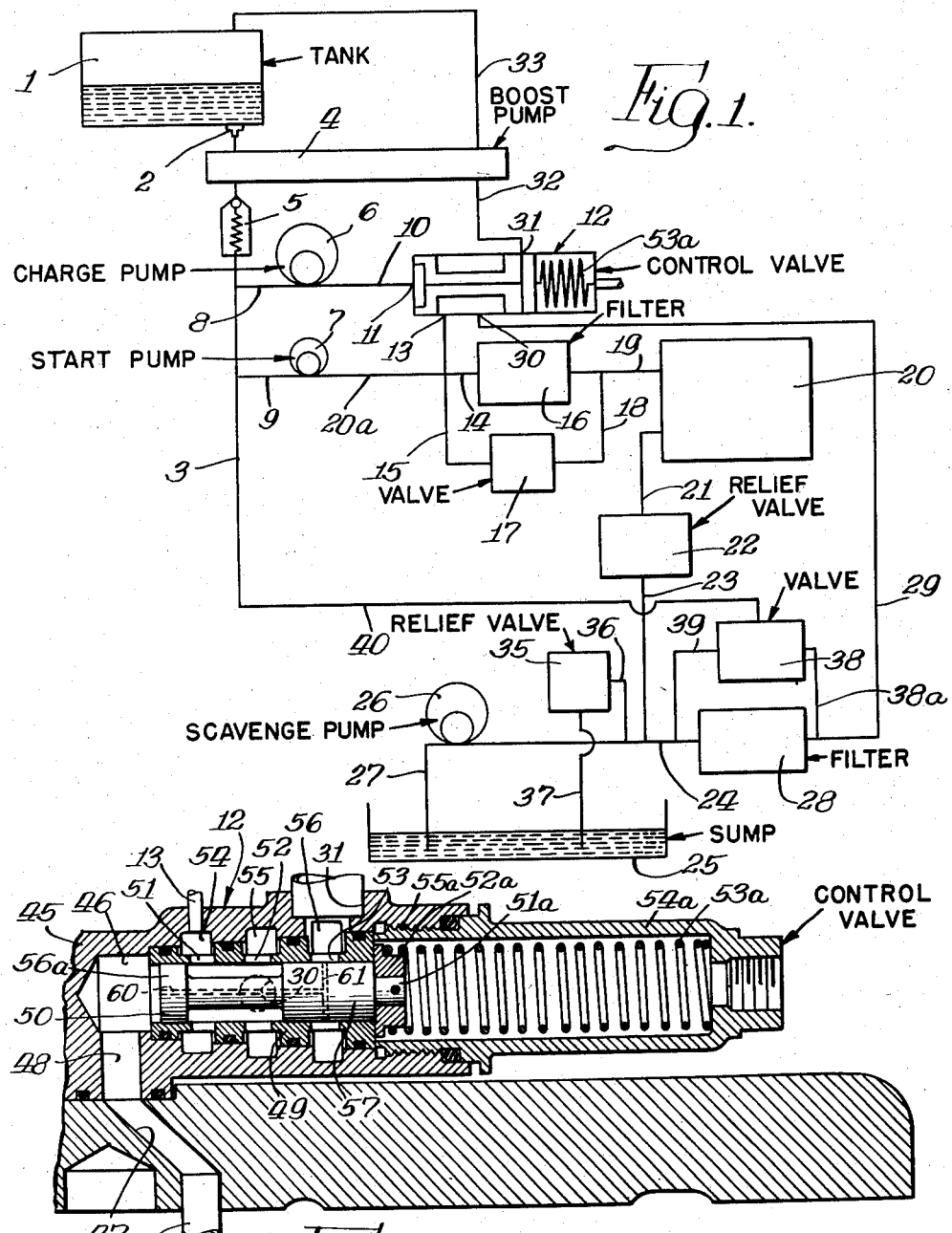
Fig. 1 is a diagrammatic view of the lubricating oil system.
Fig. 2 is a vertical section of the main control valve for the lubricating oil system taken longitudinally through the center thereof and which is shown diagrammatically in Fig. 1.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

In mechanism requiring constant lubrication, a failure of lubricating oil pressure may sometimes occur because of a clogged filter or because the mechanism is subjected to negative gravity conditions such as are encountered when the mechanism is in an aircraft in inverted flight. The disclosed invention embodies a first source of lubricating oil for the mechanism and a second alternate source of lubricating oil for the mechanism when there is failure in the supply of lubricating oil from the first source.

As shown in Fig. 1, a main oil tank 1 has an outlet 2 connected to a line 3 in which a boost pump 4 and a check valve 5 are connected. A charge pump 6 and a start pump 7 which may be of the gear and crescent type are arranged in parallel and have their inlets connected to line 3 by lines 8 and 9, respectively.

The charge pump 6 has its outlet connected by a line 10 to an inlet port 11 of a control valve 12. The control valve 12 has a first outlet port 13 which by line 14 is connected to an oil filter 16 and by line 15 is connected to an oil filter bypass valve 17 which may open upon a pressure drop across the filter (such as in response to clogging of the filter 16) to permit oil to flow through the lines 18 and 19 to a mechanism 20 which is to be lubricated. When the filter 16 is operating properly, oil will flow therefrom from line 19 into the mechanism 20. The start pump 7 has its outlet connected by a line 20a to the lines 14 and 15 and is effective to lubricate the mechanism 20 upon start-up. The mechanism 20 may be a constant speed drive, such as shown in the application of Carl L. Sadler, Robert H. Eisengrein, and George H. Hermanson, Serial No. 259,872, filed September 2, 1955, now Patent No. 2,803,112.

Lubricating oil leaves the mechanism 20 through the line 21 and the relief valve 22 which maintains a predetermined pressure of the lubricating oil and opens upon pressure in excess thereof to permit flow through the line 21 and a line 23 which discharges into a scavenge pump outlet line 24.

A scavenge pump 26 which may be of the gear and crescent type has its inlet connected to a sump 25 by a line 27 and the line 24 is connected to the outlet side of the scavenge pump. The line 24 also connects with an inlet of a scavenge filter 28 and an outlet thereof is connected by a line 29 to an inlet port 30 of the control valve 12. An outlet port 31 from the control valve 12 communicates with the boost pump 4 by a line 32 and with the main oil tank 1 by a line 33 on the outlet side of the boost pump. The pressure in the line 24 is limited to a predetermined amount by a relief valve 35 connected between the line 24 and the sump 25 by a pair of lines 36 and 37.

A bypass valve 38 has its inlet side connected to line 24 by a line 39 and is normally closed but arranged to be opened in response to a predetermined pressure drop across the scavenge filter 28 as would occur upon clogging of the scavenge filter and, when opened, operates to connect the line 24 with a line 40 connected to the outlet side of the bypass valve 38 and the line 3 connected to the inlets of the charge pump 6 and the start pump 7.

The control valve 12 is shown in Fig. 2 and comprises a casing 45 provided with a chamber 46 which communicates with the valve inlets 11 and 30 and the valve outlets 13 and 31. The valve inlet 11 causes oil to enter into one end of the valve chamber through a pair of passages 47 and 48.

A valve sleeve 49 is mounted within the chamber 46 to slidably receive a valve member 50. The valve sleeve 49 has circumferential rows of openings 51, 52 and 53 which communicate, respectively, with annular grooves 54 and 55 and 56 associated with the outlet port 13, the inlet port 30 and the outlet port 31, respectively. The valve member 50 has a stem 51a on which a valve stem stop 52a is mounted to limit movement of the valve member toward the left, as viewed in Fig. 2, by engagement with the valve sleeve 49. The valve member is urged in this direction by a helical spring 53a mounted in a housing 54a which is threadably secured to the valve casing 45, as indicated at 55a.

The valve member 50 has lands 56a and 57 with a reduced section therebetween arranged to interconnect inlet port 30 and outlet port 13 when the valve member is positioned as shown in Fig. 2, or alternatively to connect inlet port 11 with outlet port 13 when the valve member shifts toward the right, as viewed in Fig. 2, such movement also serving to connect inlet port 30 with outlet port 31. For ease of description, the last-described position of the valve member may be referred to as the normal position thereof, while the position of the valve member shown in Fig. 2 may be referred to as the "bootstrap" position of the valve member.

The valve member is drilled along its axis to form a small diameter passage 60 which connects with a cross drilled passage 61 and, with the valve member in bootstrap position, the inlet port 11 and the outlet port 31 are both connected to the main tank. With the valve member 50 in normal position, the cross drilled passage 61 will be blocked by the valve sleeve 49. However, any oil leaking through the cross drilled passage may escape through the spring housing 54a. The passages 60 and 61 provide an orifice to create an actuating pressure differential on opposite sides of the valve member 50 when shifting from bootstrap to normal position.

In normal operation, the start pump 7 is driven by the input shaft to the mechanism 20, and the start pump will deliver a small amount of oil to the mechanism 20. When the mechanism 20 starts functioning, the output shaft thereof will drive the charge pump 6 and also the scavenge pump 26. The charge pump 6 will deliver lubricating oil to the control valve 12 and, when the pressure builds up sufficiently, will shift the valve member 50 toward the right, as viewed in Fig. 2, so as to place the valve member in normal position. This build-up in pressure is aided by the passages 60 and 61 in the valve member which serve to bleed off air. With the valve member in normal position, the flow of oil from the charge pump 6 is into inlet 11 of the control valve and out of outlet 13 to the mechanism 20. This oil will normally flow to the scavenge pump outlet line 24 through the relief valve 22 which is set to permit the passage of oil at substantially the same pressure as required to shift the main control valve member 50 into normal position and then flow to tank 1 through filter 28, valve 12 and boost pump 4.

If, for any reason, a loss of oil flown from the charge pump 6 occurs, the spring 53a acts to move the valve member to the bootstrap position shown in Fig. 2. This loss of pressure or oil flow may occur from a clogged oil line or zero or negative "G" conditions, such as occur when the system is in an aircraft which is in inverted flight. With the valve member 50 in bootstrap position, the outlet port 13 leading to the mechanism 20 is cut off from valve inlet port 11 and is connected to the inlet port 30 which is connected to the outlet of the scavenge pump 26.

If, for any reason, the scavenge filter 28 should become clogged when in bootstrap operation, the bypass valve 38 will open to permit oil to flow through line 40 and line 3 to the inlet of the start pump 7 which will then direct lubricating oil through the charge filter 16 or the bypass valve 17 to the mechanism 20. Under these conditions, sufficient amount of oil is not delivered through the lines 40 and 3 to the charge pump 6 so as to cause the output therefrom to shift the valve 12 out of bootstrap operation.

With the valve member 50 in normal position, the scavenge pump 26 is effective to direct oil through the scavenge filter 28 to inlet 30 of valve 12, and the valve member is positioned so as to connect the inlet 30 with the outlet 31 leading to the main oil tank 1.

The passages 60 and 61 provided in the valve member 50 provide an air purging feature which precludes the possibility of switching the valve member from bootstrap to normal position due to air flow rather than oil flow and which also allows a rapid reprime of the charge pump when oil reaches the charge pump from the main oil tank 1 after a bootstrap operation.

It will be seen from the foregoing description that, with the valve member 50 in normal position, lubricating oil is delivered from the charge pump 6 to the inlet port 11 of the valve against the land 56a of the valve member. The lubricating oil pressure holds the valve member 50 in normal position against the urging of the spring 53a so as to connect the inlet port 11 with the outlet port 13 from the valve. The outlet port 13 communicates with the mechanism 20 to be lubricated and the foregoing structure constitutes a first source of lubricating oil for the mechanism which is operative under normal conditions. If abnormal conditions should arise, as, for example, when the mechanism is subjected to negative gravity conditions, the charge pump 6 could fail to supply lubricating oil through the inlet port 11 of the valve and the resulting drop in pressure exerted against the valve member 50 results in the spring 53a becoming effective to shift the valve member into bootstrap operation wherein lubricating oil is delivered from the scavenge pump 26 to the inlet port 30 of the valve which is then in communication with the outlet port 13 of the valve leading to the mechanism 20. This last-described structure thus constitutes an alternate second source of lubricating oil for the mechanism when an abnormal condition exists which renders the first source of lubricating oil inoperative.

I claim:

1. A lubricating oil system for a mechanism comprising, an oil tank, a sump, a charge pump normally oil-primed from the tank, a scavenge pump normally operative to direct oil from the sump to the tank, a valve having a chamber with a first inlet at one end and a second inlet, said inlets communicating with the charge and scavenge pumps, respectively, first and second outlets communicating with said mechanism and oil tank, respectively, a valve member in said chamber having a first position in response to a predetermined fluid pressure at the first inlet in which the first inlet and the first outlet are in communication as are the second inlet and the second outlet and a second position in which the communication between the valve inlets and outlets is reversed, means defining a passage in the valve member for urging air from the first inlet to the second outlet when the valve member is in its second position, a spring acting on the valve member at the end thereof remote from said first inlet and effective to shift the valve member from first to second positions when the pressure at said first inlet falls below said predetermined amount.

2. A lubricating oil system for a mechanism comprising, an oil tank, a sump, a charge pump normally oil-primed from the tank, a scavenge pump normally operative to direct oil from the sump to the tank, a valve having a chamber with a first inlet at one end and a second inlet, said inlets communicating with the charge and scavenge pumps, respectively, first and second outlets communicating with said mechanism and oil tank, respectively, a valve member in said chamber having a first position when the charge pump is primed with oil in which the first inlet and the first outlet are in communication as are the second inlet and the second outlet and a second position in which the communication between the valve inlets and outlets is reversed, spring means acting on the valve member in opposition to pressure of oil flowing from the charge pump and effective upon loss of charge pump pressure to shift the valve member from first to second positions.

3. A lubricating oil system for a mechanism comprising, an oil tank, a charge pump normally oil-primed from the tank, a scavenge pump, a valve having inlets communicating with the charge pump and the scavenge pump, respectively, and a first outlet communicating with said mechanism and a second outlet communicating with the tank, a valve member responsive to normal discharge pressure from the charge pump to direct flow from the charge pump to the first valve outlet and connect the scavenge pump to the second outlet and responsive to failure of normal discharge pressure from the charge pump to reverse the connection of the valve outlets to the charge and scavenge pumps so as to have the scavenge pump function as a charge pump, and means defining an air-purge passage in the valve member to purge air from the charge pump inlet to the second outlet when said connections are reversed.

4. A lubricating oil system for a mechanism comprising, an oil tank, a sump, a charge pump normally oil-primed from the tank, a scavenge pump normally operative to direct oil from the sump to the tank, a valve having inlets communicating with the charge pump and the scavenge pump, respectively, and a first outlet communicating with said mechanism and a second outlet communicating with the tank, and a valve member responsive to normal discharge pressure from the charge pump to direct oil flow to the first valve outlet and connect the scavenge pump to the second outlet and responsive to failure of normal discharge pressure from the charge pump to reverse the connection of the valve outlets to the charge and scavenge pumps.

5. A lubricating fluid system for a mechanism subject to negative gravity conditions comprising, a tank, a sump, a charge pump normally primed from the tank, a scavenge pump normally operative to direct fluid from the sump to the tank, a closable fluid flow connection from the charge pump to the mechanism, a normally closed fluid flow connection from the scavenge pump to the mechanism, pressure-responsive means for closing said first-mentioned fluid flow connection and opening said second-mentioned fluid flow connection when the charge pump fails to pump fluid.

6. A pressure oil lubricating system for use with mechanism subject to negative gravity conditions comprising, in combination, a main tank, a sump, means including a valve having a valve member for directing oil under pressure from the main tank through said mechanism, means including said valve and a flow passage from the valve to tank for directing oil under pressure from the sump to the main tank, and a spring in said valve responsive to a drop of oil pressure within said first-mentioned means for shifting said valve member to direct oil from the sump through said mechanism and close said flow passage.

References Cited in the file of this patent

UNITED STATES PATENTS

| | | |
|---|---|---|
| 1,647,135 | Johnson | Nov. 1, 1927 |
| 1,799,271 | Woolson | Apr. 7, 1931 |
| 2,347,471 | Dornbrook | Apr. 25, 1944 |
| 2,440,371 | Holley | Apr. 27, 1948 |